United States Patent [19]
Durocher

[11] Patent Number: 5,852,867
[45] Date of Patent: Dec. 29, 1998

[54] METHOD OF MANUFACTURING A STEERING COLUMN STALK SWITCH APPARATUS

[75] Inventor: Daniel J. Durocher, Leonard, Mich.

[73] Assignee: ITT Industries, Inc., White Plains, N.Y.

[21] Appl. No.: 462,568

[22] Filed: Jun. 5, 1995

Related U.S. Application Data

[62] Division of Ser. No. 124,667, Sep. 21, 1993, Pat. No. 5,473,809, which is a continuation of Ser. No. 972,615, Nov. 6, 1992, abandoned.

[51] Int. Cl.⁶ .................................................. H01H 11/00
[52] U.S. Cl. ............................................................ 29/622
[58] Field of Search ................................. 29/622; 200/4, 200/61.54

[56] References Cited

U.S. PATENT DOCUMENTS

| | | | |
|---|---|---|---|
| 3,209,092 | 9/1965 | Vitaloni et al. | 200/61.34 |
| 3,459,913 | 8/1969 | Mutschler et al. | |
| 3,476,896 | 11/1969 | Schreiber | 200/61.54 |
| 3,646,300 | 2/1972 | Manabe . | |
| 3,699,292 | 10/1972 | Ohkita . | |
| 3,719,787 | 3/1973 | Tomecek | 200/61.27 |
| 3,892,932 | 7/1975 | Erdelitsch et al. | 200/61.54 |
| 3,934,101 | 1/1976 | Jones | 200/61.54 |
| 3,940,579 | 2/1976 | Bühl et al. | 200/61.54 |
| 4,122,317 | 10/1978 | Shimamune et al. | |
| 4,129,757 | 12/1978 | Cryer | 200/61.54 |
| 4,149,048 | 4/1979 | Winter et al. | 200/61.54 |
| 4,186,290 | 1/1980 | Matsuo . | |
| 4,200,773 | 4/1980 | Komatsu et al. | |
| 4,219,706 | 8/1980 | Koch et al. | 200/61.54 |

(List continued on next page.)

FOREIGN PATENT DOCUMENTS

| | | |
|---|---|---|
| 0329968 | 8/1989 | European Pat. Off. . |
| 1904616 | 8/1970 | Germany . |
| 2533802 | 2/1977 | Germany . |
| 2620192 | 4/1979 | Germany . |
| 3128752 | 5/1982 | Germany . |
| 3219579 | 12/1982 | Germany . |
| 3122353 | 1/1983 | Germany . |
| 3237055 | 4/1983 | Germany . |
| 3336877 | 5/1985 | Germany . |
| 3336878 | 5/1985 | Germany . |
| 3402082 | 7/1985 | Germany . |
| 1327040 | 8/1973 | United Kingdom . |
| 2135125 | 8/1984 | United Kingdom . |
| 2135126 | 8/1984 | United Kingdom . |

*Primary Examiner*—P. W. Echols
*Attorney, Agent, or Firm*—J. Gordon Lewis

[57] ABSTRACT

A method of manufacturing a steering column stalk switch apparatus includes the steps of fixedly engaging a hub attached to an elongated shaft to one end of a hollow housing have apertures formed at opposite ends, movably mounting a button in one of the apertures in the housing, the button being movable between first and second positions and biased to the first position, mounting a first electrical contactor having first electrical contacts thereon in the button, movably mounting a second electrical contactor with second electrical contacts thereon in the housing, the first and second electrical contacts being co-planarly aligned, mounting a circuit board with conductive tracings in the housing such that the first and second contacts slidably engage the conductive tracings and complete circuits therebetween depending upon the position of the first and second electrical contacts, mounting the second electrical contactor on a movable carrier in the housing, biasingly mounting a detent paw on the carrier, aligning an arm mounted on the hub and having first and second spaced detents and an angular ramp extending from the second detent with the detent paw for selective engagement of the detent paw with the first and second detents and for movement along the annular ramp as the carrier undergoes user generated movement, and forming the conductive tracings at discrete timed intervals with respect to the position of the first and second electrical contacts.

15 Claims, 4 Drawing Sheets

U.S. PATENT DOCUMENTS

| | | | |
|---|---|---|---|
| 4,249,055 | 2/1981 | Matsuo . | |
| 4,273,971 | 6/1981 | Trequrtha . | |
| 4,277,658 | 7/1981 | Delp et al. | 200/61.54 |
| 4,291,213 | 9/1981 | Felland et al. | 200/335 |
| 4,292,485 | 9/1981 | Kondo et al. . | |
| 4,293,743 | 10/1981 | Iwata et al. | 200/61.54 |
| 4,321,437 | 3/1982 | Cryer . | |
| 4,327,264 | 4/1982 | Botz et al. | 200/61.54 |
| 4,336,428 | 6/1982 | Berginski | 200/61.54 |
| 4,376,236 | 3/1983 | Long et al. | 200/61.27 |
| 4,376,237 | 3/1983 | Long | 200/61.54 |
| 4,379,954 | 4/1983 | Iwata et al. | 200/61.54 |
| 4,387,279 | 6/1983 | Brevick . | |
| 4,400,598 | 8/1983 | Jandl et al. | 200/61.54 |
| 4,404,438 | 9/1983 | Honjo | 200/61.54 |
| 4,531,026 | 7/1985 | Terajima et al. . | |
| 4,543,848 | 10/1985 | Beauch | 200/61.54 |
| 4,613,737 | 9/1986 | Nishijima . | |
| 4,754,209 | 6/1988 | Mizuta . | |
| 4,871,885 | 10/1989 | Kamada . | |
| 5,003,132 | 3/1991 | Lagier | 200/4 |
| 5,075,519 | 12/1991 | Hayakawa . | |
| 5,107,243 | 4/1992 | Maeda . | |
| 5,193,669 | 3/1993 | Demeo et al. . | |

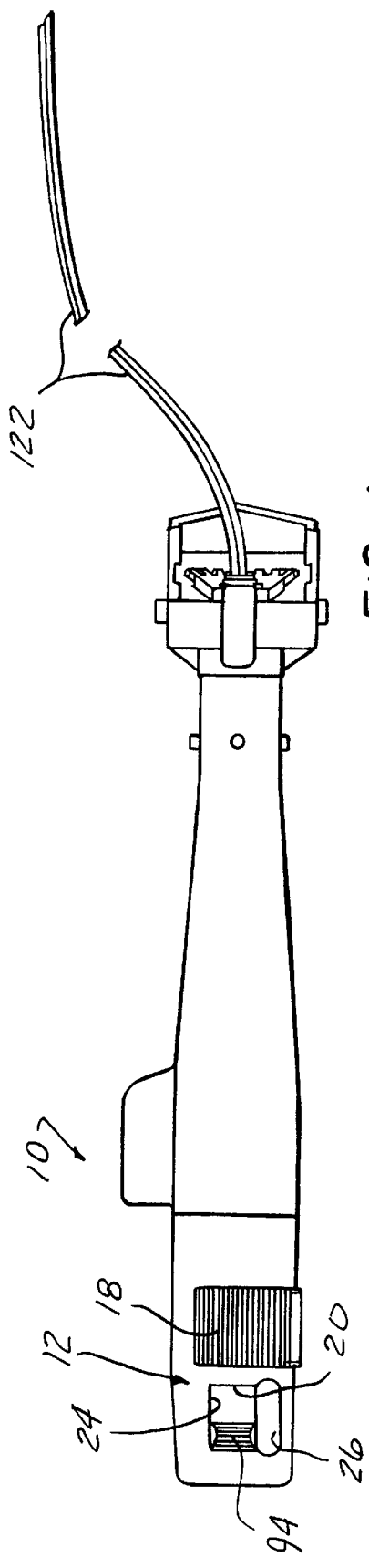
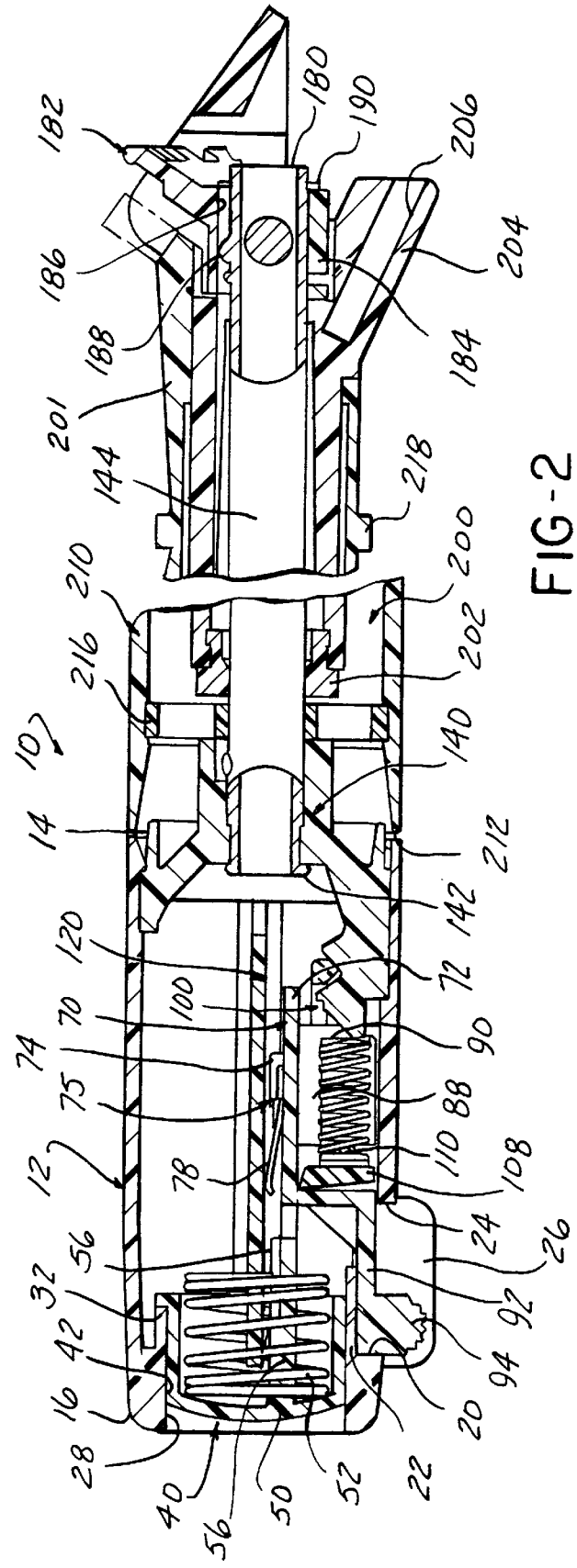

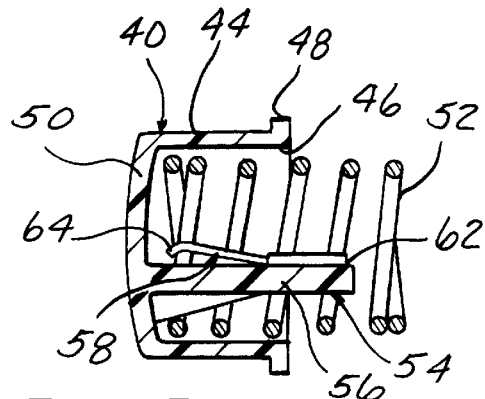
FIG-5
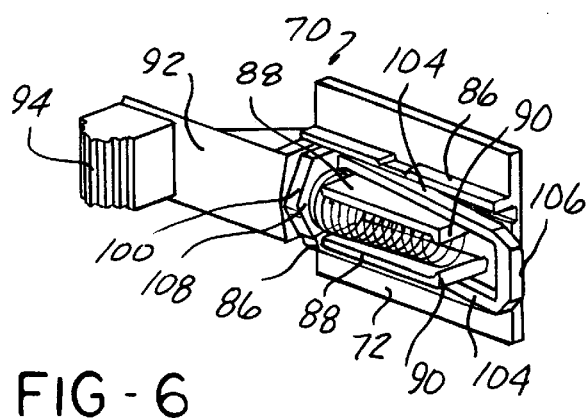
FIG-6
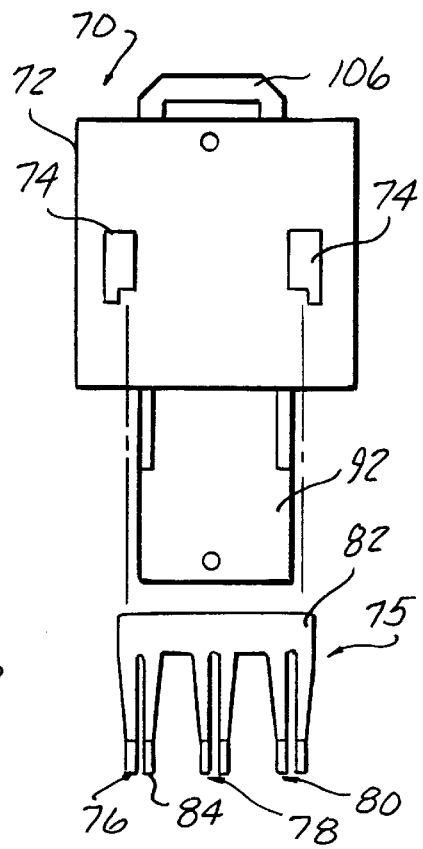
FIG-7
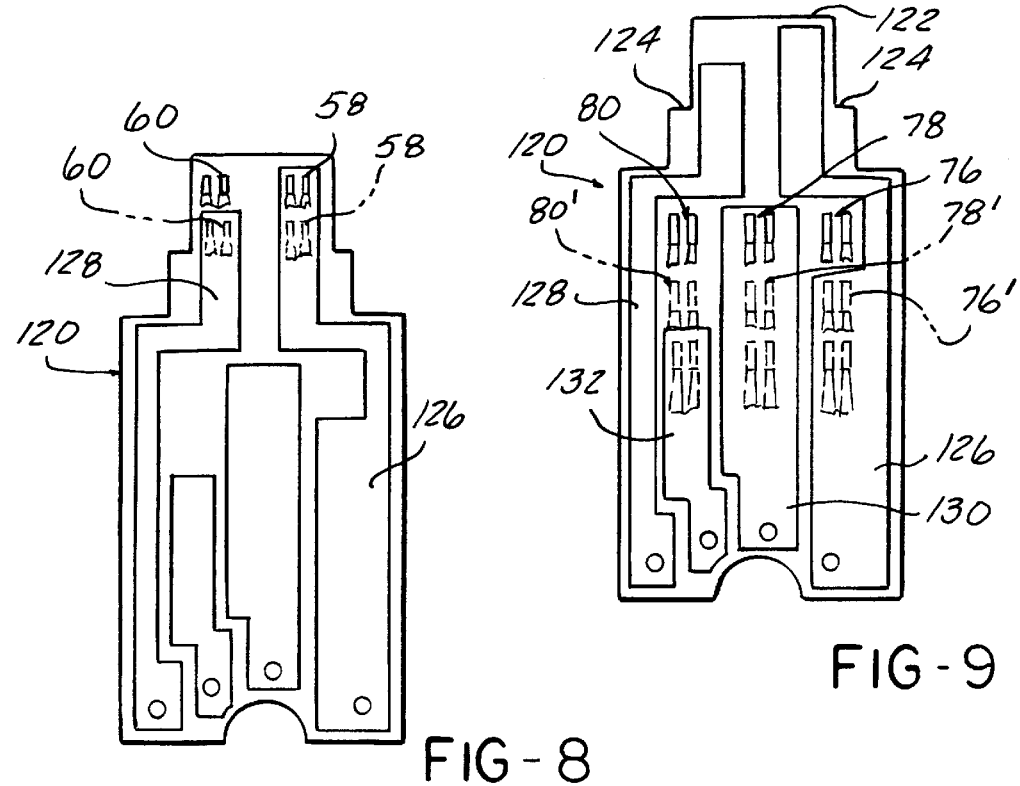
FIG-8
FIG-9

METHOD OF MANUFACTURING A STEERING COLUMN STALK SWITCH APPARATUS

This application is a continuation of application Ser. No. 08/124,667, filed Sep. 21, 1993, now U.S. Pat. No. 5,473,809 which is a continuation of application Ser. No. 07/972,615, now abandoned.

BACKGROUND OF THE INVENTION

1. Field of the Invention

The present invention relates, in general, to motor vehicles and, more specifically, to steering column mounted switches controlling vehicle operating circuits and devices.

2. State of the Art

The evolution of steering column switches in motor vehicles has been toward greater integration of functions in a single switch. Previously, a plurality of individual switches, each controlling a single function, i.e., turn signals, windshield wipers, etc., were mounted on the vehicle dashboard or steering column. Current steering column switches are designed to control a variety of functions or vehicle operating circuits, for example, turn signals/hazard lights, high beam and low beam headlights with optional flash-to-pass, parking lights, and windshield wiper and wash functions, including multi-speed wipers with or without delay.

Typically, a steering column switch includes a single lever or stalk pivotally mounted on one side of a housing attached to the steering column in an easily accessible position for the driver of the vehicle. The lever is gimballed at one end in the housing so as to move in one of two mutually separate planes. Further, the lever may be provided with a rotatable end cap as well as a slidable member movable along the longitudinal axis of the lever. Actuators are mounted in the housing and, in response to movement of the lever in one direction, i.e., such as in one of the two mutually separate planes, or rotation of the end cap, move a switching member carrying contacts between various switching positions to effect the switching of electrical connections for a particular vehicle operating circuit.

In a typical application, pivotal movement of the lever in a substantially vertical plane about its gimballed connection to the housing controls the vehicle turn signals, and pivotal movement of the lever in a substantially horizontal plane controls the switching of the vehicle headlights between low beam, high beam and, optionally, flash-to-pass. Rotation of the end cap is used to control the operation of the vehicle windshield wiper system between on and off states and, optionally, a plurality of intermittent distinct speeds.

In vehicles employing an automatic cruise control, a slide switch or member is mounted in the end cap and is selectively movable between various positions including off, on, and a momentary resume set speed position. A spring-biased button is movably mounted in the end of the end cap and is employed to set a desired speed for the cruise control device. Movement of the slide member and/or the button between various positions cause electrical contacts mounted within the lever to close various circuits of the cruise control device depending upon the specific position of the slide member and the set speed button.

It is imperative in vehicles employing a cruise control device that the cruise control be designed to insure that the momentary resume set speed position is completely momentary such that a sticking of the switch member in the resume position is prevented. Furthermore, the steering column stalk switch must be easily and smoothly operable and, at the same time, must present a positive, user friendly tactile feel. To achieve these goals, the stalk switch must be designed with no looseness or play between the various members and must insure that the slide member positively engages each of the various detent positions during operation.

Thus, it would be desirable to provide a method of manufacturing a steering column stalk switch which incorporates numerous vehicle operating circuit functions into a single switch lever assembly. It would also be desirable to provide a method of manufacturing a steering column stalk switch which provides easy and smooth operation of the various movable components thereof and, at the same time, provides a positive, tactile feel for the movement of such components between various positions. It would also be desirable to provide a method of manufacturing a steering column stalk switch which provides a simple assembly of the stalk switch.

SUMMARY OF THE INVENTION

The present invention is a unique method of manufacturing a steering column stalk switch apparatus.

The present method comprises the steps of:

a. attaching a hub to an elongated tubular shaft;

b. forming a hollow housing with first and second apertures at first and second opposed ends, respectively;

c. movably mounting a button in the second aperture in the housing, with the button being movable between first and second positions and normally biased to the first position;

d. mounting a first electrical contactor with a plurality of first electrical contacts mounted thereon in the button, the first electrical contactor being movable with the button;

e. movably mounting a second electrical contactor with a plurality of second electrical contacts mounted thereon in the housing for movement between a plurality of positions;

f. co-planarly aligning the plurality of first and second electrical contacts in the housing;

g. mounting a circuit board having a plurality of electrically conductive tracings thereon in the housing in engagement with the hub, the conductive tracings being slidably engaged by the plurality of first and second electrical contacts during movement of the button and the second electrical contactor, respectively;

h. mounting the second electrical contactor on a movable carrier disposed in the housing, the carrier having a projection extending exteriorly of the housing for user force to move the carrier between a plurality of different positions;

i. biasingly mounting a detent paw on the carrier;

j. aligning an arm on the hub having first and second spaced detents and an angular inclined ramp extending from the second detent with the detent paw for selective engagement of the detent paw with the first and second detents and for movement of the detent paw on the angular ramp as the carrier undergoes user generated movement through the housing; and k. forming the conductive traces on the circuit board at discrete intervals timed in position with the discrete positions of the first electrical contacts on the button and the second electrical contacts on the second electrical contactor mounted on the carrier for energizing separate electrical circuits connected to the conductive tracings in each discrete position of the button and the carrier.

In a preferred embodiment, the method also includes the steps of forming each of the plurality of first and second contacts in a cantilevered form with a first end of each of the contacts being fixedly connected to the respective first and second electrical contactors and a second end cantileverly extending from the first end and freely and movably disposed from the first and second electrical contactors, respectively. The second ends of each of the plurality of the first and second electrical contacts are oriented in the same direction toward the button in the housing. This simplifies insertion of the circuit board into the housing after the button and the carrier, respectively carrying the first and second electrical contactors, have been mounted in the housing. Ribs are preferably formed in the housing for spaced mounting of the carrier and the circuit board in the housing.

The present method also includes the steps of providing a biasing member in the housing to normally bias the button to the first position and, at the same time, bias the circuit board into fixed engagement with the hub. This eliminates any looseness or play between the button, the circuit board and the hub.

In the present method, the conductive tracings on the circuit board are intervals with respect to the positions of the plurality of first and second electrical contacts when such first and second electrical contacts are moved various discrete positions by movement of the associated button, the carrier and the second electrical contactor. The conductive tracings are provided with different start points from one end of the circuit board such that selective contacts engage selective conductive tracings at each discrete position of the button and the carrier.

The present method also includes the step of forming the arm on the hub with an outer end and a first projection adjacent the outer end. The first projection has a selected first profile. A second projection is formed adjacent to and spaced from the first projection on the arm and has a second profile. The first detent is formed between the first and second projections. The angular ramp is formed at a selected angle on the arm and extends from the second projection. The second detent is formed between the second projection and the start of the ramp. In this manner, the height, ramp angles and the first and second profiles of the first and second projections, respectively, as well as the angle of the ramp may be tailored to meet the design requirements of any application. Primarily, the ramp angle, and the height and the profiles of the first and second projections are selected to provide a smooth sliding movement of the carrier as well as a positive tactile feel and engagement of the detent paw in each of the first and second detents. Furthermore, the unique orientation of the biasing spring used to bias the detent paw to the first position also biases the carrier normally away from the hub when the carrier is advanced to a position bringing the detent paw to the angular ramp. This assures a positive return of the detent paw from a position along the inclined ramp to the second detent and thereby prevents any sticking or undesirable positioning of the detent paw on the ramp after user force on the carrier has been removed.

The method of manufacturing a steering column stalk switch apparatus of the present invention provides a simplified, low cost method of manufacturing such a stalk switch apparatus. The method provides selected tailoring of the design of the detent portions of the apparatus to meet the needs of a particular application and to address the desirable characteristics of smooth operation and positive tactile feel in each position of the carrier and the button.

BRIEF DESCRIPTION OF THE DRAWING

The various features, advantages and other uses of the present invention will become more apparent by referring to the following detailed description and drawing in which:

FIG. 1 is a front elevational view of a steering column stalk switch apparatus according to the present invention;

FIG. 2 is a longitudinal cross sectional view generally taken along line 2—2 in FIG. 1;

FIG. 5 is a longitudinal cross sectional view of the set button shown in FIGS. 2 and 3;

FIG. 6 is a perspective view showing the assembled carrier, detent paw and detent biasing spring;

FIG. 7 is an exploded, front elevational view showing the mounting of the second electrical contactor on the carrier;

FIG. 8 is a plan view showing the discrete positions of the first electrical contactor on the circuit board;

FIG. 9 is a diagrammatic view showing the position of the contacts of the second electrical contact or on the circuit board;

DESCRIPTION OF THE PREFERRED EMBODIMENTS

Figure 3:
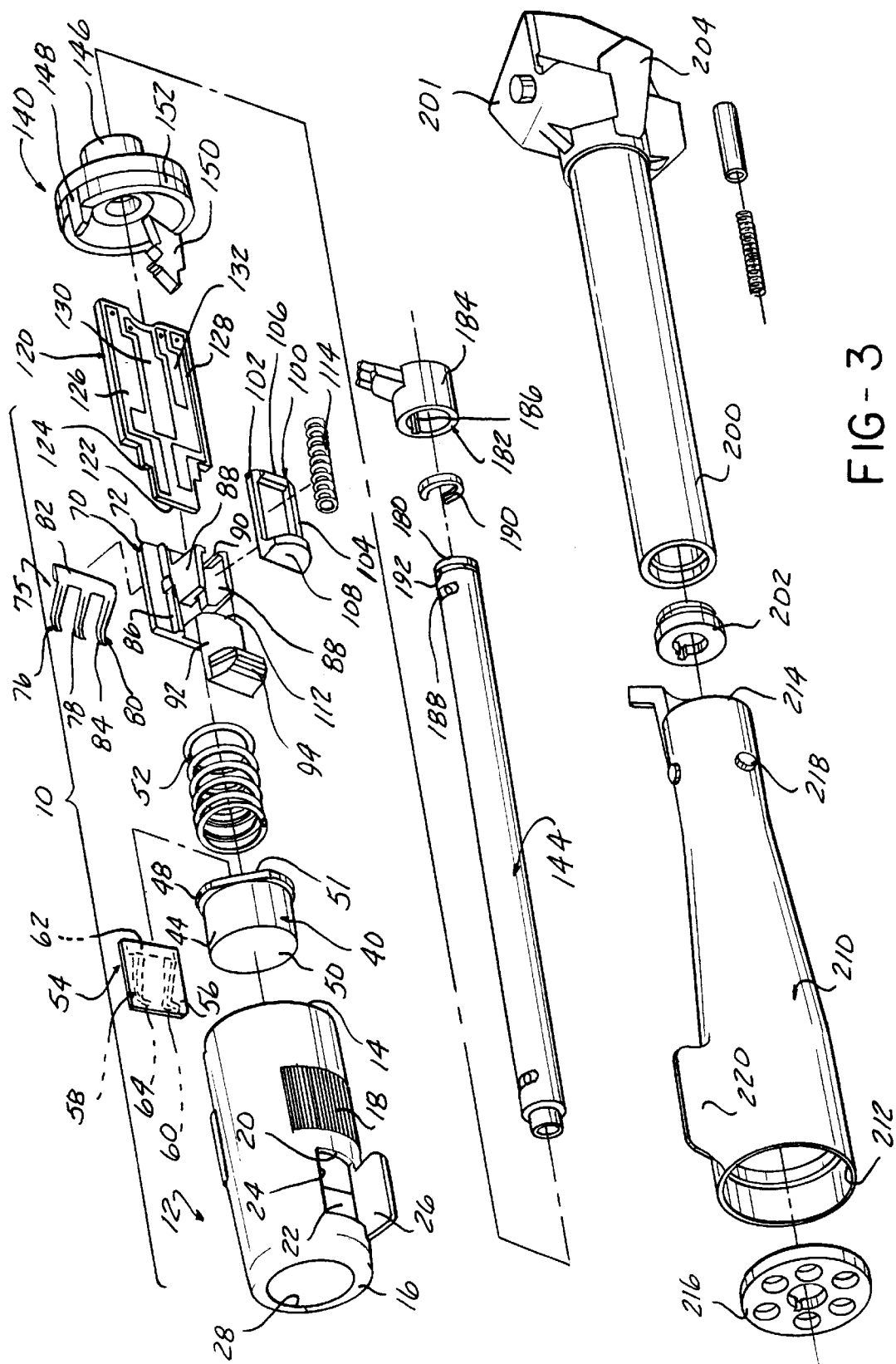
FIG. 3 is an exploded, perspective view of the steering column stalk switch apparatus shown in FIG. 1.

Referring now to the drawing, and to FIG. 1 in particular, there is illustrated a steering column mounted stalk switch apparatus 10 which is operative to control the operation of various vehicle operating circuits and devices, such as a vehicle windshield wiper and washer controls, turn signals, vehicle headlight switching between low and high beam and the on, off, set and resume set speed operations of a vehicle cruise control device.

Figure 4:
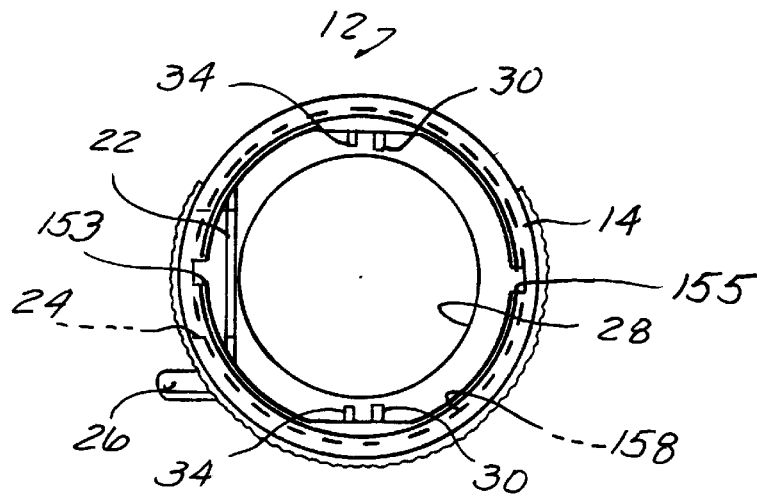
FIG. 4 is a right end elevational view of the knob housing of the steering column stalk switch apparatus shown in FIG. 1.

As shown in FIG. 1, and in greater detail in FIGS. 2–4, the steering column stalk switch apparatus 10 includes a knob or housing 12 which may be stationarily or, preferably, rotatably mounted on the end of the stalk switch apparatus 10. The housing 12 is hollow and is preferably formed of molded plastic. The housing has first and second opposed ends 14 and 16, respectively, and a side wall which tapers from the slightly larger diameter first end 14 to the smaller diameter second end 16. A gripping ring 18, preferably in the form of an annular arrangement of knurls, is formed exteriorly on the side wall of the housing 12 to aid in rotating the housing 12.

A slot 20 is formed in the side wall of the housing 12 adjacent the second end 16. A wall 22 is integrally formed with the side wall of the housing 12 but is inset in the slot 20 to close off a portion of the length of the slot 20 as shown in FIGS. 2 and 3. A first aperture 24 is formed between the end of the wall 22 and one edge of the slot 20 as shown in FIG. 3. A protective tab 26 is integrally formed with the side wall of the housing 12 and extends radially outward from the housing 12 below the slot 20.

A second aperture 28 is formed in the second end 16 of the housing 12, the purpose of which will be described in greater detail hereafter. As shown in FIG. 4, a plurality of internally formed pairs of ribs are formed in the housing 12 and provide mounting seats for various components of the stalk switch apparatus 10, as described hereafter. A first pair of ribs 30 are formed in a diametrically opposed manner in the housing 12. The ribs 30 extend substantially the entire length of the housing 12 from the first end 14 to the inner edge of an internal sleeve 32 which extends inward from the second end 16 of the housing 12 and is spaced at the inner end from the side wall of the housing 12 as shown in FIG. 2. A second pair of diametrically opposed ribs 34 are also formed in the housing 12 and are circumferentially spaced from the first pair of ribs 30. The second pair of ribs 34 extends only partially from the inner edge of the sleeve 32 toward the first end 14 of the housing 12.

Further details of the housing 12 will be described hereafter in conjunction with other components of the steering column stalk switch assembly 10.

A button 40 is movably mounted in a bore 42 formed by the internal sleeve 32 in the second end 16 of the housing 12. As shown in FIG. 5, the button 40 is in the form of a hollow cap-like member having a cylindrical side wall 44, an open first end 46 bounded by a radially outwardly extending flange 48 and a solid second end wall 50. A flat 51, shown in FIG. 2, is formed in a limited angular portion of the annular flange 48 and slidably engages the inner portion of the wall 22 in the slot 20 in the housing 12 to key the position of the button 40 in a desired orientation within the housing 12.

A button biasing means, denoted generally by reference number 52, is mounted within the interior of the button 40 and extends partially outward from the first end 46 thereof. The button biasing means 52 is preferably in the form of a coil spring which seats at one end on the solid second end wall 50 of the housing 44 of the button 40.

A first electrical contactor 54 is fixedly mounted within the button housing 44 by any suitable means, such as, preferably, by heat staking. The first electrical contactor 54 includes a plastic base 56. A plurality of first electrical contacts, such as two electrical contacts 58 and 60, are mounted on the base 56. The contacts 58 and 60 are integrally connected at a first end 62 and each extends to a second end 64 in a direction toward the solid second end wall 50 of the button housing 44 in a resilient, cantilevered fashion. The contacts 58 and 60 are formed of any suitable electrically conductive material, such as copper. As shown in FIG. 5, the second ends 64 of each of the contacts 58 and 60 are spaced from the base 56 of the first electrical contactor 54.

As shown in FIGS. 2, 3, 6 and 7, a carrier 70 is slidably mounted within the knob housing 12. The carrier 70 includes a generally rectangular or square base 72 formed of an insulating material, such as plastic. A pair of spaced clips 74 are formed on one surface of the base 72 of the carrier 70 and include a portion spaced from one surface of the base 72. The clips 74 are spaced apart on the base 72 and snapingly receive a second electrical contactor 75 therein.

As shown in FIGS. 2, 3 and 7, the second electrical contactor 75 includes a plurality of bifurcated, resiliently movable contacts, such as contacts 76, 78 and 80. Each of the contacts 76, 78 and 80 are integrally joined together at a first end 82. The first end 82 is mounted in the clips 74 in a snap-together fit to securely attach the second electrical contactor 75 to the base 72 of the carrier 70. The second ends 84 of each of the contacts 76, 78 and 80 extends from the common first end 82 upwardly and outwardly away from the clip 74 when the second contactor 75 is mounted on the base 72 of the carrier 70. It should be noted that the second ends 84 of each of the contacts 76, 78 and 80 of the second electrical contactor 75 extend toward the solid second end wall 50 of the button 40 in the same manner as the contacts 58 and 60 of the first electrical contactor 54.

An outer pair of side walls 86 are formed on the opposite surface of the base 72 of the carrier 70 as shown in FIGS. 3 and 6. The outer pair of side walls 86 have a relatively short height. An inner pair of side walls 88 are formed between the outer pair of side walls 86 and have a greater height so as to extend above the outer pair of side walls 86. The inner pair of side walls 88 are spaced apart and have an inwardly facing flange 90 formed at one end. The flanges 90 face each other and are spaced apart to define an aperture therethrough.

An L-shaped leg 92 is integrally formed with and extends above and longitudinally outward from one end of the base 72 of the carrier 70. An arcuate projection 94 is formed at one end of the leg 92. The leg 92 is configured to be slidably disposed in the slot 20 in the knob housing 12 in engagement with the outer surface of the wall 22 formed in the slot 20. In this mounting orientation, the projection 94 extends exteriorly of the slot 20 above the protective tab 26. The projection 94 forms a suitable surface for user engagement to slidably move the carrier 70 between a number of positions, as described hereafter.

A detent paw 100 is mounted on the carrier 70. The detent paw 100 has a generally rectangular shape formed of opposed side walls 102 and 104 which are mountable between the inner and outer pair of walls 86 and 88 on the carrier 70. The detent paw 100 also includes a first end 106 and a raised, opposed second end 108. A projection 110, shown in FIG. 2, is formed on the raised second end 108 of the detent paw 100 and faces the first end 106.

The raised second end 108 is mounted between the ends of the inner walls 88 of the carrier 70 and a shoulder 112 formed by a portion of the leg 92 extending upward from the base 72 of the carrier 70.

Detent biasing means 114, preferably in the form of a coil spring, is mounted under a preload force on the carrier 70. The detent biasing means or spring 114 seats over the projection 110 on the raised second end 108 of the detent paw 100 and the inwardly extending flanges 90 on the inner walls 88 of the carrier 70. In this position, as shown in FIG. 6, the spring 114 exerts a force against the second end 108 of the detent paw 100 to pivot the first end 106 of the detent paw 100 away from the base 72 of the carrier 70. However, the first end 106 of the detent paw 100 is capable of movement toward the base 72 of the carrier 70 during sliding movement of the carrier 70 as described hereafter.

In assembling the components described thus far, the first electrical contactor 54 is fixedly mounted in the button 40 by heat staking or other suitable means with the raised second ends 64 of the contacts 58 and 60 of the first electrical contactor 54 extending toward the second end or solid end wall 50 of the button 40. The button 40 is then slidably mounted in the knob housing 12 with the flat 51 on the button 40 aligned with the inner surface of the wall 22 in the slot 20 in the housing 12 to properly align the button 40 in the housing 12. In this position, the solid end wall 50 is accessible exteriorly through the second aperture 28 in the second end 16 of the housing 12, as shown in FIG. 2.

The detent paw 100 is mounted on the carrier 70 such that the side walls 102 and 104 are disposed between the pairs of inner and outer walls 86 and 88 on the carrier 70. The biasing spring 114 is then inserted between the flanges 90 of the inner walls 88 and the raised second end 108 of the detent paw 100. The spring 114 is thus under a compressive force and biases the first end 106 of the detent paw 100 away from the base 72 of the carrier 70.

Next, the carrier 70 is slidably inserted into the housing 12 such that the surface of the base 72 on which the clips 74 are mounted slidably engages one side of the diametrically opposed ribs 34. The clips 74 are thus disposed between the ribs 34. The carrier 70 is inserted into the housing 12 to bring the projection 94 outward through the slot 20 with the leg 92 slidably engaging the inner wall 22, as shown in FIG. 2. In this position, the carrier 70 is capable of sliding movement to the right, in the orientation shown in FIG. 2 and 3, with the leg 92 completely covering the aperture 24 in the housing 12. Likewise, the inner wall 22 in the housing 12 cooperates with the leg 92 of the carrier 70 to close off the aperture 24 at all times to prevent the entry of foreign matter into the interior of the housing 12.

As shown in FIGS. 2 and 3, and in greater detail in FIGS. 8 and 9, the stalk switch assembly 10 also includes a circuit board 120 which is slidably inserted into the housing 12. The circuit board 120 is of conventional construction and is formed of a suitable electrically insulating material. A plurality of electrically conductive traces are formed on one surface of the circuit board 120 and are individually connected to electrical conductors 121, shown in FIG. 1, which are in turn connected to various operating circuits of a cruise control device.

The circuit board 120 is mounted in the housing 12 between the diametrically opposed pairs of ribs 30 and 34. In this orientation, the exposed surface of the conductive traces face the contacts of the first and second electrical contactors 54 and 75 so as to be wiped by the contacts of the contactors 54 and 75 during movement of the button 40 and the carrier 70 as described hereafter. The first end 122 of the circuit board 120, which is inserted toward the second end wall 50 of the button 40, is formed with a necked down region which forms opposed shoulders 124. The shoulders 124 form a seat for the button biasing spring 52. As the circuit board 120 is held in a fixed position within the steering column stalk switch apparatus 10, as described hereafter, the biasing spring 52 normally biases the button 40 to a first position toward the second end 16 of the knob housing 12 as shown in FIG. 2. However, user exerted force on the solid end wall 50 of the button 40 is capable of overcoming the force of the biasing spring 52 and move the button 40 to a second position in which the contacts of the first electrical contactor 54 mounted thereon engage certain conductive tracings on the circuit board 120.

As shown in FIG. 8, in the normal first or off position shown in FIG. 2, the contacts 58 and 60 of the first electrical contactor 54 mounted in the button 40 engage the portions of the circuit board 120. In this first position, the first contacts 58 engage a first conductive trace 126 on the circuit board 120. The second electrical contacts 60 engage an insulating portion of the circuit board 120 such that no electrical power flows between the contacts 58 and 60. However, movement of the button 40 to the second position brings the first and second contacts 58 and 60 of the first electrical contactor 54 carried thereon to a second position shown in phantom in FIG. 8. In this position, the first contacts 58 remain in engagement with the conductive trace 126. The second contacts 60, in this second position, engage a second conductive trace 128 thereby forming a circuit between the contacts 58 and 60 to supply electrical power to the set speed circuit of the vehicle cruise control device. Release of the button 40 will enable the biasing spring 52 to return the button 40 to the normal, first position shown in FIG. 2 in which the electrical circuit between the contacts 58 and 60 opens.

It should be noted that the conductive tracings 126 and 128 are disposed in a predetermined length, start point from the first end 122 and timed relationship with respect to the position of the button 40 so as to engage the contacts 58 and 60 in each distinct first and second position of the button 40 as described above.

FIG. 9 depicts the operation of the contacts 76, 78 and 80 of the second electrical contactor 75 mounted on the carrier 70 in various operative states depending upon the position of the carrier 70. In a first position of the carrier 70, as depicted in FIG. 2, the electrical contacts 76, 78 and 80 will be oriented as shown in FIG. 9. The first electrical contacts 76 engage an insulating portion of the circuit board 120. The second electrical contacts are disposed in engagement with a conductive trace 130 on the circuit board 120. The third electrical contacts 80 are also disposed in engagement with an insulating portion of the circuit board 120. This position of the contacts 76, 78 and 80 and the carrier 70 is defined in the exemplary embodiment as an "off" position of the vehicle cruise control device.

Movement of the carrier 70 from the first position shown in FIG. 2 to a second position, as described hereafter, brings the contacts 76, 78 and 80 to the position shown in phantom in FIG. 9 and depicted by reference numerals 76', 78' and 80'. In this position, the first and second electrical contacts 76 and 78 engage the conductive traces 126 and 130, respectively, on the circuit board 120 to form a closed circuit therebetween. The third electrical contact 80' remains in engagement with an insulating portion of the circuit board 120. This position is defined, in the exemplary embodiment, as the "on" position of the vehicle cruise control.

Further movement of the carrier 70 to the right in the orientation shown in FIG. 2 brings the contacts 76, 78 and 80 to a third position shown in phantom in FIG. 9. In this position, each of the contacts 76, 78 and 80 is respectively disposed in contact with the conductive traces 126, 130 and 132 on the circuit board 120. This position is defined, in the exemplary embodiment, as the "resume set speed" position of the vehicle cruise control. The carrier 70 is capable of movement in an opposite direction to the second or first positions at the user's preference.

A hub 140 is mounted on one end 142 of a shaft 144. The hub 140, which is preferably formed of molded plastic, has a cylindrical first end 146 with an internal bore and a key slot which is mountable over the first end 142 of the shaft 144. After the hub 140 is mounted on the first end 142 of the shaft 144, the outer end portion of the first end 142 of the shaft 144 is flared outward to secure the hub 140 in a fixed position on the shaft 144.

It should be noted that FIG. 3 depicts the hub 140 and the shaft 144 90° out of their normal mounting position for reasons of clarity. The hub 140 also includes a pair of spaced longitudinally extending arms 148 and 150 which extend longitudinally from a raised annular end flange 152 on a second end of the hub 140. The arms 148 and 150 are devised to slidably engage key slots 153 and 155, respectively, extending inward from the first end 14 of the knob housing 12, as shown in FIG. 4. This orients the hub 140 in a predetermined position with respect to the housing 12. As further shown in FIG. 4, the first end 14 of the knob housing 12 has a slight, radially inward taper extending from the first end 14. An enlarged annular recess 158 is formed adjacent the taper and receives the raised annular flange 152 on the hub 140 in a snap-together fit to permanently secure the hub 140 to the knob housing 12.

Figure 10:
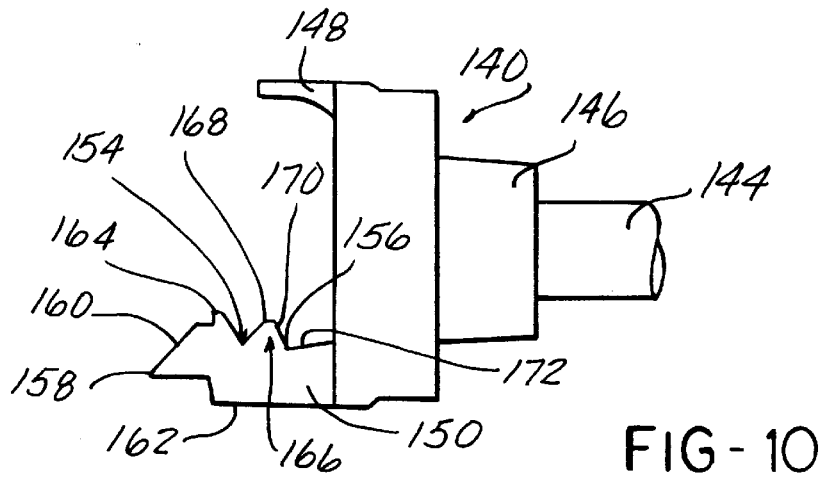
FIG. 10 is an enlarged side elevational view of the detents on the hub.
Figure 11:
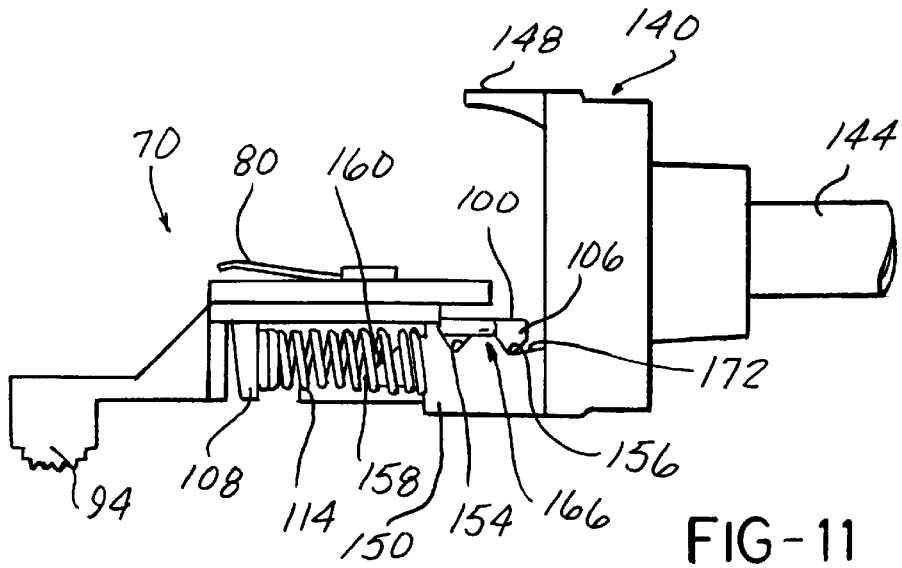
FIG. 11 is an enlarged side elevational view showing the detent paw on the resume set speed ramp.

The second arm 150 is formed with first and second detents 154 and 156, respectively, as more clearly shown in FIGS. 10 and 11. Specifically, the arm 150 has an outer end 158 from which an inclined ramp 160 extends at an acute angle from an outer peripheral portion or base 162 of the arm 150. A raised projection 164 is formed at the top end of the ramp 160. A recess or first detent 154 is formed by an angular surface extending from the projection 164 toward the base 162 of the arm 150. This recess or first detent position 154 defines the "off" position of the vehicle cruise control when the first end 106 of the detent paw 100 is disposed therein, as shown in FIGS. 2 and 10. A second projection 166 is also formed in the arm 150. The second projection 166 is spaced from the first projection 164 and is formed with opposed angularly inclined ramp surfaces 168 and 170, respectively. The second ramp surface 170 terminates in a second detent position 156 as shown in FIG. 10. When the first end 106 of the detent paw 100 is disposed in the second detent position 156, the vehicle cruise control is energized or in the "on" position through the second contacts 76 and 78. In this position, inward movement of the button 40 will set a predetermined vehicle speed for the cruise control device. A further inclined ramp surface 172 extends angularly upward from the second detent position or recess 156 away from the base 152. This ramp surface 172 defines a momentary "resume set speed" position for the vehicle cruise control.

To complete the assembly of the stalk switch apparatus 10, after the circuit board 120 has been slidably inserted into the knob housing 12, as described above, the hub 140, having previously been fixedly mounted on the first end 142 of the shaft 144, will be urged into a snap fit with the first end 14 of the knob housing 12, as also described above. This brings the second end of the hub 140 into fixed engagement with one end of the circuit board 120 so as to fixedly dispose the circuit board 120 in a non-movable position within the stalk switch apparatus 10. During the sliding insertion of the hub 140 into the knob housing 12, the first end 106 of the detent paw 100 will slidably engage the ramp 160 and will pivot from its normal position toward the base 72 of the carrier 70 sufficient to clear the projection 164 and seat in the first detent position 154 in the arm 150 on the hub 140.

In use, movement of the carrier 70 to the right, in the orientation shown in FIG. 2, will cause the first end 106 of the detent paw 100 to move over the projection 166 into the second detent position 156 with a positive stop. Further, movement of the carrier 70 to the right will cause the detent paw 100 to move along the ramp surface 172 to bring the contacts 76, 78 and 80 to the third position shown in phantom in FIG. 9 which activates the resume set speed circuit of the vehicle cruise control.

As shown in FIG. 11, during such movement of the first end 106 of the detent paw 100 along the ramp 172, the first end 158 and end ramp 160 of the arm 150 on the hub 140 slides within the detent biasing spring 114 contained within the inner side walls 90 on the carrier 70 and further compresses the coil spring 114. In this manner, release of the projection 94 on the carrier 70 will enable the coil spring 114 to urge the carrier 70 to the left in the orientation shown in FIG. 11 away from the first end 158 of the arm 150 on the hub 140 to bring the first end 106 of the detent paw 100 back to the second detent position 156. This retains the cruise control in the "on" position. At any time, the user may exert a leftward movement on the projection 94 of the carrier 70 to bring the first end 106 of the detent paw 100 over the projection 166 and back to the first detent position 154, shown in FIG. 10, to deactivate or turn off the vehicle cruise control.

The profiles, ramp angles and heights of the first and second projections, the spring force of the detent spring 114 and the pivot point of the detent paw 100 may be tailored to provide any desired sliding movement and tactile feel for the operation of the carrier 70. Further, these characteristics are chosen so that a positive return of the detent paw 100 from the ramp 172 to the second detent position 166 is insured.

The shaft 144 preferably comprises a hollow cylinder having a second end 180 opposed from the first end 142. A gear means 182 is fixedly mounted on the second end 180 of the lever 144. The gear means 182 by way of example includes an annular collar 184 having an internal key slot 186 which slidably engages a key projection 188 formed on the shaft 144, adjacent the second end 180 thereof. The gear means 182 includes a plurality of radially extending, circumferentially spaced teeth which are designed to engage a driven gear, not shown, mounted in a switch housing attached to the stalk switch assembly 10. The gear means 182 drives the driven gear which, in turn, moves a contact attached thereto between engagement with various fixed contacts mounted in the switch housing to selectively control the operation of an electrical device, such as a vehicle windshield wiper assembly between off, on and a plurality of discrete, intermittent operating speeds depending upon the degree and direction of rotation of the housing 12. By way of example only, the gear means 182 comprises a non-involute gear disclosed in co-pending U.S. patent application Ser. No. 07/887,064, filed May 22, 1992, in the name of Daniel J. DuRocher, one of the present Applicants, and entitled "NON-INVOLUTE GEAR", the contents of which are incorporated herein by reference. A C-ring 190 is slidably engageable in an annular recess 192 formed on the shaft 144, adjacent the second end 180 thereof, to retain the gear means 182 on the shaft 144.

As shown in FIGS. 2 and 3, the second end 180 of the shaft 144 is pivotally connected to a switch housing 201 for pivotal movement in at least one of two mutually separate plane, i.e., generally vertical and horizontal. The pivot connections used to pivotally attach the lever 144 to the switch housing 201 and the various operators moved by such pivotal movement of the entire stalk switch apparatus 10 in two mutually exclusive planes can be had by referring to U.S. Pat. No. 5,049,706, filed in the name of Daniel J. DuRocher, one of the present Applicants, and entitled "MULTIFUNCTION STEERING COLUMN SWITCH", the contents of which are incorporated herein by reference.

As shown in FIGS. 2 and 3, a lever 200 having a generally hollow, elongated cylindrical shape is mounted concentrically about the shaft 144. A bearing 202 is mounted in one end of the lever 200, preferably by a snap fit, to rotatably mount the shaft 144 within the lever 200. The opposite end of the lever 200 has an outwardly extending flange 204 with an internal bore 206 which receives a spring-biased plunger.

Finally, to complete the steering column stalk switch apparatus 10, an outer washer paddle housing 210 having a generally cylindrical shape with a larger diameter first end 212, and a side wall which tapers to a smaller diameter, opposed second end 214, is rotatably disposed over the lever 200. The housing 210 receives a bearing 216 in the first end 212 through which the shaft 144 rotatably extends. The second end 214 of the housing 210 rotatably rests on the exterior surface of the lever 200. A plurality of radially extending, circumferentially spaced projections 218 are formed on the exterior surface of the housing 210 for mounting a rubber boot around the switch assembly thereto in a conventional manner. A paddle arm 220 is integrally formed with and extends radially outward from the first end 212 of the housing 210 to provide a convenient gripping surface for rotating the housing 210.

In summary, there has been disclosed a unique method of manufacturing a steering column mounted stalk switch apparatus which provides a simplified construction over previously devised methods of manufacturing stalk switches. The present method provides a stalk switch apparatus which presents a positive tactile feel and smooth movement of the various sliding members and movable button between various positions.

What is claimed is:

1. A method of manufacturing a steering column stalk switch apparatus for a vehicle comprising the steps of:

co-axially arranging first and second housing portions such that the first and second housing portions are independently coaxially rotatable with respect to each other and co-act to form an elongated, substantially closed stalk switch housing;

rotatable disposing a first end of an elongated shaft with respect to the first switch means;

fixedly mounting a first switch operator on the first end of the shaft, the first switch operator rotating the first switch means between operative states for controlling one vehicle function;

fixedly connecting the first housing portion to a second end of the shaft for simultaneous rotation of the shaft with the first housing portion;

coaxially extending the shaft through the second housing portion;

connecting a second operator to the second housing portion and to a second switch means such that rotation of the second housing portion causes rotation of the second operating means to operate the second switch means controlling another vehicle function;

providing a third switch for operating a certain other vehicle function; and rotatably mounting the second end of the shaft to a pivotal housing such that pivotal movement of the shaft in at least one plane switches the third switch between operative states.

2. The method of claim 1 further comprising the step of:

forming the coaxially arranged first and second housing portions as a continuous exterior surface on a stalk switch housing.

3. The method of claim 1 wherein the step of fixedly connecting further comprises the steps of:

fixedly mounting a hub on the second end of the shaft; and fixedly engaging the hub to the first housing portion.

4. The method of claim 3 further comprising the step of:

biasingly mounting a circuit board in the first housing portion in engagement with the hub, the circuit board including a plurality of electrically conductive tracings disposed at sequenced intervals;

connecting electrical conductors to the conductive tracings;

biasingly mounting a first movable member in the first housing portion, the first movable member being movable between first and second positions and normally biased to the first position;

mounting a first electrical contact on the first movable member, the first electrical contact engaging certain conductive tracings on the circuit board when the first movable member is in the second position to close an electrical circuit connected to the certain conductive tracings.

5. The method of claim 1 further comprising the step of:

fixedly mounting a circuit means in the first housing portion for forming a plurality of electrical conductors.

6. The method of claim 5 further comprising the steps of:

movably mounting a first movable member in the first housing portion for movement from a first normal position to at least a second position; and mounting a first electrical contact on the first movable member, the first electrical contact engaging certain electrical conductors when the first movable member is in the second position to close electrical circuits connected to the certain electrical conductors for controlling certain operating functions of the vehicle.

7. The method of claim 6 further comprising the step of:

forming the first electrical contact of a plurality of bi-furcated resilient contacts, each fixed at one end to the first movable member and cantilevered from the first movable member to a opposed end.

8. The method of claim 5 further comprising the steps of:

movably mounting a second movable member in the first housing portion for movement between at least first and second positions; and mounting a second electrical contact on the second movable member for engaging certain electrical conductors when the second movable member is in the second position for controlling certain operating functions of the vehicle.

9. The method of claim 8 further comprising the step of:

forming the second electrical contact of a plurality of bi-furcated resilient contacts, each fixed at one end to the second movable member and cantilevered from the second movable member to a opposed end.

10. The method of claim 9 further comprising the step of:

mounting a detent paw having first and second opposed ends on the second movable member for movement between first and second positions;

providing a detent paw biasing means for normally biasing the detent paw to the first position;

fixedly mounting a hub to one end of the first housing portion;

forming an arm on the hub, the arm extending axially from the hub;

forming first and second spaced detents on the arm;

axially aligning the arm and the first end of the detent paw such that the first end of the detent paw is slidably movable between the first and second detents upon sliding movement of the second movable member between the first and second positions;

engaging the arm with the detent paw biasing means when the second movable member is urged to a position in which the first end of the detent paw extends beyond the second detent for biasing the second movable member to the second detent.

11. The method of claim 10 further comprising the step of:

forming a ramp surface on the arm, the ramp surface extending angularly from the second detent.

12. The method of claim 5 further comprising the steps of:

movably mounting a first movable member in the first housing portion for movement from a first normal position to at least a second position;

mounting a first electrical contact mounted on the first movable member, the first electrical contact engaging certain electrical conductors when the first movable member is in the second position to close electrical circuits connected to the certain electrical conductors for controlling certain operating functions of the vehicle;

forming the first electrical contact of a plurality of bi-furcated resilient contacts, each fixed at one end to the first movable member and cantilevered from the first movable member to a opposed end;

movably mounting a second movable member in the first housing portion for movement between at least first and second positions;

forming the second electrical contacts of a plurality of bi-furcated resilient contacts, each fixed at one end to the second movable member and cantilevered from the second movable member to a opposed end; and mounting a second electrical contact on the second movable member;

engaging the second electrical contacts mounted on the second movable member with certain electrical conductors when the second movable member is in the second position for controlling certain operating functions of the vehicle.

13. The stalk switch apparatus of claim 12 co-planarly aligning the first and second electrical contacts within the first housing portion.

14. The method of claim 5 further comprising the steps of:

forming the circuit means of a circuit board including a plurality of electrically conductive tracings disposed at sequenced intervals; and connecting the electrical conductors to the conductive tracings, the electrical conductors extending from the steering column stalk housing.

15. The method of claim 1 further comprising the step of fixedly extending a lever from the third switch, the lever extending at least partially through the second housing portion and rotatably receiving the shaft therethrough.

* * * * *